United States Patent [19]
Galetto et al.

[11] 3,764,709
[45] Oct. 9, 1973

[54] SYNTHETIC ONION OIL COMPOSITION

[75] Inventors: William G. Galetto, Cockeysville; Carol A. Pace, Baltimore, both of Md.

[73] Assignee: McCormick & Company, Inc., Cockeysville, Md.

[22] Filed: July 13, 1971

[21] Appl. No.: 162,266

[52] U.S. Cl. .................................. 426/65, 260/608
[51] Int. Cl. .............................................. A23l 1/26
[58] Field of Search ................... 99/140 R; 260/608

[56] References Cited
UNITED STATES PATENTS
3,523,975  8/1970  Evers et al. .................... 99/140 R
3,615,601  10/1971  Brodnitz ............................ 99/140 R

OTHER PUBLICATIONS

Brodnitz et al., "Gas Chromatographic Analysis Of Distilled Onion Oil," Food Technology, Vol. 24, (1970), pp. 78–80.

*Primary Examiner*—Morris O. Wolk
*Assistant Examiner*—Sidney Marantz
*Attorney*—Cushman, Darby & Cushman

[57] ABSTRACT

A synthetic onion oil composition consists essentially of a blend of dialkyl disulfides and dialkyl trisulfides wherein the alkyl moiety of the di- and tri-sulfides is methyl and propyl.

6 Claims, No Drawings

SYNTHETIC ONION OIL COMPOSITION

This invention relates to synthetic onion oil composition and to a method of producing the same.

Natural onion oil is used extensively in the preparation of many industrially flavored food products and it is generally prepared by distilling onions. This method of preparation, however, requires significant capital expenditures in terms of equipment, time and labor and thus contributes to the high cost of natural onion oil, which cost, in turn, is reflected in the price of products made therewith.

In accordance with the present invention, it has now been found that a synthetic onion oil composition can be prepared by a method relatively less expensive and more simple than known methods for producing natural onion oil. Further, the present invention advantageously provides a method for producing a synthetic onion oil more uniform in its composition and flavor-imparting characteristics than natural onion oil. Additionally, the method of this invention permits tailoring the composition and its flavor-imparting characteristics to the specifications and desires of the user.

Thus, the present invention provides a synthetic onion oil composition comprising a mixture of dialkyl disulfides and dialkyl trisulfides, wherein the alkyl moiety of said disulfides and said trisulfides is selected from the group consisting of methyl and propyl. More particularly, the prsent invention provides a synthetic onion oil composition comprising a mixture of about 30–90 weight percent of said dialkyl disulfides and about 10–70 weight percent of said dialkyl trisulfides.

A preferred embodiment of the present invention provides a synthetic onion oil composition comprising a mixture of 0–10 weight percent dimethyl disulfide, 10–30 weight percent methyl propyl disulfide, 15–60 weight percent dipropyl disulfide, 5–30 weight percent methyl propyl trisulfide and 5–50 weight percent dipropyl trisulfide.

The synthetic onion oil composition of this invention imparts a characteristic onion flavor to foods and thus can effectively be used whenever such a flavor is desired. Generally, the amount of the composition employed will range from about 0.001 to 0.1 percent by weight of the food to be flavored, although it will be recognized that the particular amount employed can depend on the preference of the consumer as well as on the particular composition being utilized.

Further, the synthetic onion oil composition of this invention can be employed in combination with edible adjuvants or carriers, conventionally employed in the flavoring or food industry such as edible oils, sugar, salt and gums, to produce a flavoring composition. Conveniently, in such flavoring compositions, the synthetic onion oil composition is present in amounts ranging from about 1.0 to 30.0 weight percent, the remainder being essentially the edible adjuvant or carrier.

The dialkyl disulfides used to prepare the synthetic onion oil composition of the present invention can be synthesized in accordance with a variety of conventional procedures. Thus, unsymmetrical dialkyl disulfides can be produced by implementing conventional disproportionation techniques. In a typical reaction, one symmetrical dialkyl disulfide having the formula RSSR is reacted with another symmetrical dialkyl disulfide having the formula R'SSR' where R and R' represent different alkyl radicals, in the presence of an alkaline solution in an alcohol medium. The reaction mixture is heated to reflux for a time sufficient to attain the degree of disproportionation desired, which can be measured or determined by monitoring the progress of the reaction using, for instance, gas-liquid chromatographic techniques. Thereafter, the product, including any unreacted alkyl disulfide, is recovered from the reaction mixture by conventional separating procedures. The product can then be recovered from unreacted alkyl disulfide by fractionation. Unreacted alkyl disulfide can, of course, be recycled to the disproportionation reaction zone.

Dialkyl trisulfides can be produced by reacting a dialkyl disulfide with sulfur in the presence of catalytic amounts of a basic catalyst. The reactants can be heated to reflux for a time sufficient to produce the desired trisulfide which can easily be recovered from the reaction mixture by distillation.

A complex mixture of symmetrical and unsymmetrical dialkyl di- and tri-sulfides can also be produced by reacting a dialkyl disulfide having the formula RSSR with another dialkyl disulfide having the formula R'SSR', wherein R and R' are different alkyl radicals, with sulfur in the presence of a catalytic amount of a basic catalyst.

The basic catalyst used in the reactions to produce the dialkyl di- and tri-sulfides can be alkali metal hydroxides, alkaline earth metal hydroxides or aliphatic amines. Preferably, an aliphatic amine such as dimethyl, dibutyl, trimethyl, triethyl, tripropyl and tributylamine, is employed.

The invention is further illustrated by the following examples.

EXAMPLE 1

Preparation of Unsymmetrical Dialkyl Disulfide 12.8 g of dimethyl disulfide, 15.6 g of dipropyl disulfide, 5 ml ethyl alcohol and 1 g potassium hydroxide are mixed together and heated to reflux for about 4 hours. The progress of the reaction was monitored by GLC analysis and at the end of the 4 hour period, about 60 percent methyl propyl disulfide had been produced with about 20 percent each of the symmetrical dialkyl disulfides remaining unreacted. The reaction mixture was then added to 50 ml ether in a separating funnel, shaken, and allowed to separate. The upper phase containing the dialkyl disulfides was washed twice with water, dried over $MgSO_4$, and fractionally distilled to yield three fractions. The first fraction consisted essentially of unreacted dimethyl disulfide. The second fraction consisted primarily of methyl propyl disulfide containing about 10–15 percent dipropyl disulfide, while the third fraction consisted essentially of dipropyl disulfide.

EXAMPLE 2

Preparation of Symmetrical Trisulfides 90 g of dipropyl disulfide, 39 g of sulfur and 7.5 g of dibutyl amine are heated in an oil bath at 130°C for 5 hours. The resulting reaction product is cooled, ether extracted, washed twice with dilute HCl, washed twice with water and then dried over $CaCl_2$. The product is then vacuum distilled to yield 73.3 g of a fraction having a B.P. of 94°–100°C at 3–4 mmHg, which is a mixture of 80–90 percent dipropyl trisulfide and 10–20 percent dipropyl disulfide.

EXAMPLE 3

Preparation of Complex Mixture of Di- and Tri-Sulfides 128.0 g of dimethyl disulfide, 312.0 g of dipropyl disulfide, 70 g of sulfur and 5.0 ml of dibutyl amine were mixed together and heated to reflux for 10 hours in a 130°C oil bath and 8 hours in a 150°C oil bath. The resulting reaction product was vacuum distilled at 3–4 mmHg, 409.7 g of distillate being recovered. The distillate consisted essentially of about 7 percent dimethyl disulfide, about 24 percent methyl propyl disulfide, about 51 percent dipropyl disulfide, about 12 percent methyl propyl trisulfide and about 6 percent dipropyl trisulfide. This distillate provides an acceptable synthetic onion oil composition.

EXAMPLE 4

A synthetic onion oil composition was prepared by mixing together:

The complex dialkyl di- and tri-sulfide mixture of Example 3 — 269.6 g

The dipropyl di- and tri-sulfide mixture of Example 2 — 35 g

The resulting mixture was spray dried at an outlet temperature of 115°C and provided a synthetic onion oil composition similar in flavor and strength to natural spray dried onion oil.

EXAMPLE 5

The procdure outlined in Example 3 was repeated to produce essentially the distillate as defined therein which was then vacuum distilled to yield the following four fractions:

Fraction 1 — B.P. 36°–42°C, 0.5 mm Hg - about 40 percent methyl propyl disulfide, about 50% dipropyl disulfide and about 10% methyl propyl trisulfide-5.65 g.

Fraction 2 — B.P. 42°–60°C, -.5 mm Hg - about 60 percent dipropyl disulfide, about 35 percent methyl propyl trisulfide, and about 5 percent dipropyl trisulfide - 6.66 g.

Fraction 3 — B.P. 60°–67°C 0.5 mm Hg - about 65 percent dipropyl trisulfide, about 30 percent methyl propyl trisulfide, and about 5 percent methyl propyldisulfide and dipropyl disulfide.

Fraction 4 — B.P. 67°–70°C. Very similar to Fraction 3. Fractions 3 and 4, 7.49 g A synthetic onion oil composition was prepared by admixing 5.65 g - Fraction 1, 7.49 g - Fractions 3 and 4 and 0.03 g dipropyl disulfide.

As can be seen from the above a variety of procedures can be employed to produce the component dialkyl di- and tri-sulfides of the synthetic onion oil composition of this invention. Methods other than those specifically exemplified above include the Bunte salt method, potassium ferricyanide oxidation of mercaptans as well as iodine oxidation of mercaptans.

Other synthetic onion oil compositions can also be produced by providing, for instance, a different combination of fractions produced in Example 5. Still another synthetic onion oil compositions are prepared by admixing with the second fraction produced in Example 1, the third and fourth fractions obtained in Example 5.

We claim:

1. A synthetic onion oil composition consisting essentially of a blend of dialkyl disulfides and dialkyl trisulfides, wherein the alkyl moiety of said di- and trisulfides is selected from the group consisting of methyl and propyl, said dialkyl disulfides being present in amounts of about 30–90 percent by weight of said composition and said dialkyl trisulfides being present in amounts of about 10–70 percent by weight of said composition.

2. The synthetic onion oil composition of claim 1 consisting essentially of 0–10 weight percent dimethyl disulfide, 10–30 weight percent methyl propyl disulfide, 15–60 weight percent dipropyl disulfide, 5–30 weight percent methyl propyl trisulfide and 5–50 weight percent dipropyl trisulfide.

3. A food flavored with a synthetic onion oil composition present in amounts of about 0.001 to 0.1 percent by weight of said food, said synthetic onion oil composition consisting essentially of a blend of dialkyl disulfides and dialkyl trisulfides, wherein the alkyl moiety of said di- and tri-sulfides is selected from the group consisting of methyl and propyl, said dialkyl disulfides being present in amounts of about 30–90 percent by weight of said composition and said dialkyl trisulfides being present in amounts of about 10–70 percent by weight of said composition.

4. The food of claim 3 wherein said synthetic onion oil composition consists essentially of 0–10 weight percent dimethyl disulfide, 10–30 weight percent methyl propyl disulfide, 15–60 weight percent dipropyl disulfide, 5–30 weight percent methyl propyl trisulfide and 5–50 weight percent dipropyl trisulfide.

5. A flavoring composition comprising an edible carrier and a synthetic onion oil composition present in amounts of about 1.0 to 30.0 weight percent of said flavoring composition, said synthetic onion oil composition consisting essentially of a blend of dialkyl disulfides and dialkyl trisulfides, wherein the alkyl moiety of said di- and tri-sulfides is selected from the group consisting of methyl and propyl, said dialkyl disulfides being present in amounts of about 30–90 percent by weight of said synthetic onion oil composition and said dialkyl trisulfides being present in amounts of about 10–70 percent by weight of said synthetic onion oil composition.

6. The flavoring composition of claim 5 wherein said synthetic onion oil composition consists essentially of 0–10 weight percent dimethyl disulfide, 10–30 weight percent methyl propyl disulfide, 15–60 weight percent dipropyl disulfide, 5–30 weight percent methyl propyl trisulfide and 5–50 weight percent dipropyl trisulfide.

* * * * *